INVENTOR.
Ronald D. Freiberger
BY
George E. Johnson
ATTORNEY

United States Patent Office 3,333,770
Patented Aug. 1, 1967

3,333,770
VACUUM POSITION SERVO SYSTEM
Ronald D. Freiberger, Kokomo, Ind., assignor to General Motors Corporation, Detroit, Mich., a corporation of Delaware
Filed July 22, 1966, Ser. No. 567,279
4 Claims. (Cl. 236—79)

ABSTRACT OF THE DISCLOSURE

This invention relates to a position servo system in which movement of a control element in a linear direction and in accordance with a variation in a condition such as temperature will effect a corresponding movement of a vacuum operated motor to correct the variation, the feedback arrangement being confined to a conduit which is the sole operative connection between the control element and the motor.

Background of the invention

Figure 1:
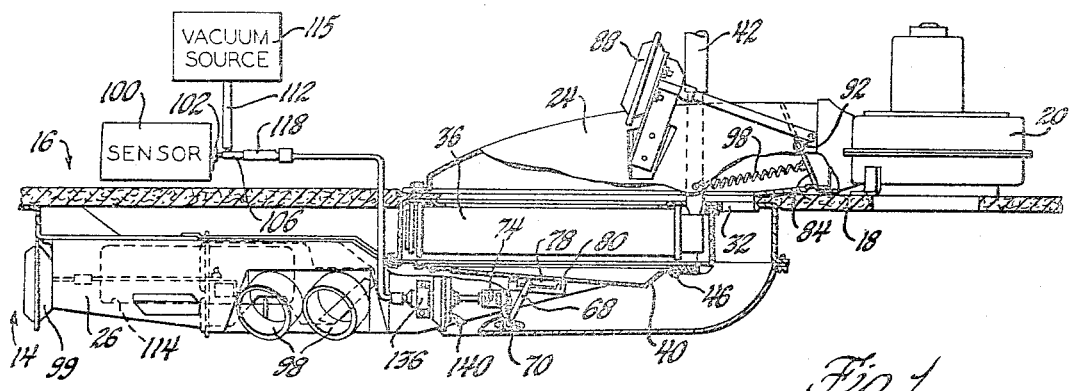

Heretofore, in the conventional operation of automotive heating and air conditioning systems, there have been utilized three basic types of control:

(1) Operation by Bowden wire mechanical push-pull action in a flexible conduit or sheath to control a damper or valve in which case considerable effort must be expended to realize the control.

(2) The use of a controlled vacuum operated diaphragm in which case work done is negligible but positioning of the controlled element is usually limited to a on-off or to three positions: (a) fully off; (b) intermediate; and (c) fully on.

(3) Regulated or modulated vacuum operated diaphragm against a spring load in which case friction encountered results in position errors of more than appreciable magnitude making the control erratic.

An object of the present invention is to provide a system which is as unitary as possible, operative by vacuum in the interest of automatic operation, in which work required of a sensor or sender is at a minimum, and in which positioning of a damper, motor or valve may be accurate despite a necessary signal or feedback from the damper, motor or valve to the sensor or sender.

Description of the invention

Figure 2:
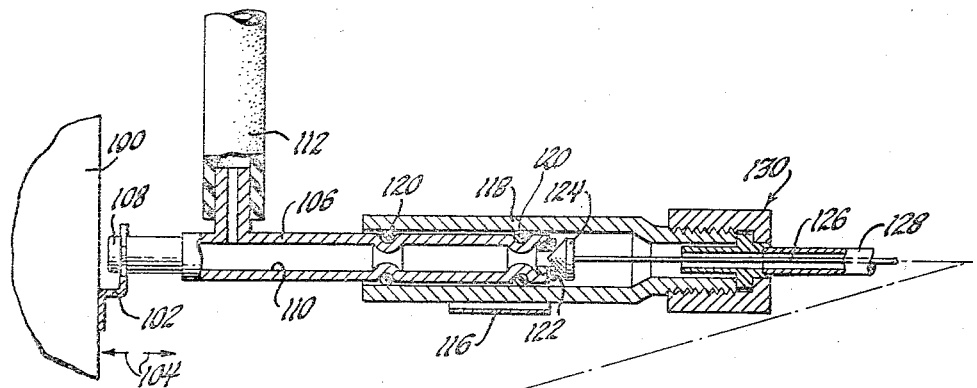
Figure 2:
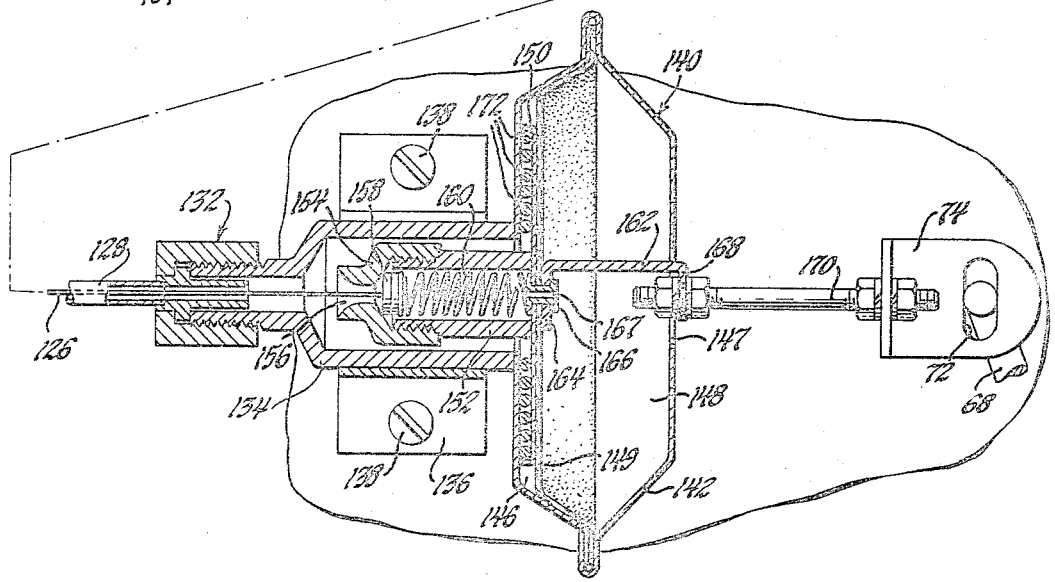

In the drawings:

FIGURE 1 is a sectional view through a fire wall in an automobile showing heat exchangers and ducting for heating and cooling a passanger compartment and the arrangement embodying the present invention; and FIGURE 2 shows an enlarged view of the servo system of FIGURE 1 with major elements being shown in section.

The arrangement of FIGURE 1 is much like that disclosed in FIGURE 4 of the United States Patent 3,084,867, granted Apr. 9, 1963, in the name of W. J. De Beaubien but the damper control is different and is in accordance with the present invention. A passenger compartment 14 is separated from an engine compartment 16 by a fire wall 18. A blower 20 is mounted on the engine side of the wall 18 to force air through a manifold 24 to a port 32 and the core of the heater 36 as permitted by a main shut-off damper 84. The latter is actuated by a vacuum motor 88 through a crank 92 and against a biasing spring 98. Engine coolant is directed to the heater 36 by a conduit 42. A proportioning damper 40 is hinged as at 46. When closed all air is directed around the heater 36 by way of the port 32. When open fully, all air goes through the heater 36 and none or practically none through the port 32. Mid- positions of the damper 40 proportion the flow of heated to unheated air and determine the temperature in the compartment 14. A crank 68 is pivoted at 70 with one end in a slot 78 of a bracket 80 fixed to the damper 40. The other end of the crank 68 extends through a slot 72 of a movable piece 74. Air from the damper 40 opening and/or the bypass opening 32 passes to the compartment 14 by way of defroster ducts 98 or an opening 114 in the end portion 26 of the air distributor arrangement. A motor 99 controls the flow through the ducts 98. These details, except for the crank 68, are as disclosed in the patent referred to above.

The system of the present invention pertains to the operation of the damper 40 in accordance with a signal from a temperature sensor 100. The latter may take the form of a bellows or some other type of device whereby a change in temperature in the passenger compartment 14 will cause linear movement in either direction of a bracket 102 as indicated by the arrows 104 in FIGURE 2. The present invention is not concerned with the nature of the sensor 100. Manual operation of the sensor 100 is included in this concept. It suffices that the sensor will move the bracket 102 and hence a piston 106 in either of opposite directions and in an extent in accordance with a variation in the passenger compartment temperature.

The piston 106 has a head 108 retained by the bracket 102 and is hollow part way its length as at 110 for the reception of vacuum from a line 112 and a source 115 which could be the engine intake manifold. Fixed to the fire wall 18 or some other part of the vehicle is a bracket 116 (FIGURE 2) holding a fixed sleeve 118 with seals 120 interposed between the sleeve 118 and the piston 106 which is slidable in the sleeve. A valve seat member 122 is threaded into the open end of the piston 106 and it is receptive to the seating of an inlet valve 124 fixed to one end of a Bowden wire 126. The latter is enclosed in a flexible sheath or conduit 128. Each end of the conduit 128 is provided with a coupling 130 or 132. The coupling 130 joins the conduit 128 to the sleeve 118 and the coupling 132 joins it to a cylindrical vacuum motor body 134. The latter is fixed by a bracket 136 and screws 138 to the heater duct work.

A diaphragm motor 140 has a casing 142 of sheet metal welded to an open end of the body 134. The interior of the casing is divided into two compartments—a vacuum space 146 and an open space 148 (vented at 147)—by a flexible diaphragm 149. A shallow flanged plate 150 is attached in fluid-tight relation to one end of a cylinder 152 and the latter is axially and freely movable within the body 134. A cap 154 with an end aperture 156 is threaded on the free end of the cylinder 152 to restrain a head or outlet valve 158. The latter is attached to the wire 126 and seated against the cap 154 by a spring 160. A U-shaped bracket 162 has one leg 164 fastened to the plate 150 with the diaphragm 149 interposed. The fastening is by a rivet 166 having a vent 167 therein. A second leg 168 extends from the opening 147 and is attached by a rod 170 to the movable piece 74. A helical coil spring 172 has its large diameter coil retained by the flange of the plate 150 and its small diameter coil acts against the casing 142.

If the compartment 14 requires less heat, it is obvious that the damper 40 should swing clockwise about the pivot or hinge 46 toward its position as viewed in FIGURE 1. This would admit less heat to the compartment 14. In order to effect this result, the sensor 100 would signal for less heat by moving the piston 106 to the left. Vacuum would then pass by the valve 124, through the conduit 128, around and along the cylinder 152 to move the diaphragm 149 to the left to approach its extreme position as shown in FIGURE 2. The crank 68 would turn counterclockwise and the damper 40 would close the required amount for making the temperature correction and no more for when the damper movement is sufficient, the wire 126 seats the valve 124 and seals off the vacuum supply to the vacuum space 146. With the vacuum supply cut off, the spring 172 will tend to hold the diaphragm position with the head 158 seated. Any further movement of the diaphragm to the left would unseat the head 158 against the action of the spring 160 to vent the space 146 and 167.

If the compartment 14 requires more heat, the piston 106 would be moved to the right by the sensor 100. The valve 124 will seat cutting off the vacuum and unseating the head 158. This would result in the travel of the diaphragm 149 to the right and under the urging of the spring 172 to open the damper 40. The head 158 would then seat and vacuum would be applied to hold the position.

The wire 126 and the conduit 128 need only be reasonably rigid in their length dimensions and the effort on the part of the operator or sensor 100 in gaining accurate damper positioning is small with the apparatus needed being very compact and simple.

I claim:

1. A vacuum position servo system comprising a conduit having ends fixed in position, vacuum inlet means at one of said ends including an inlet valve, said means being connected to a source of vacuum and being movable with respect to said conduit, means for moving said vacuum inlet means in accordance with a variation in a condition such as temperature, a diaphragm motor at the other end of said conduit, a spring loaded diaphragm in said motor and movable with respect to said conduit, a vent valve associated with said motor, and a wire extending through said conduit and connecting said valves, spring means urging said valve and wire as a unit toward positions at which said valves are closed.

2. A system as set forth in claim 1, said conduit and wire each possessing flexibility and lengthwise stability.

3. A system as set forth in claim 1, said means at one of said end, comprising a hollow piston with an open end controlled by said inlet valve, and said piston, wire and valves being adapted to be moved with respect to said conduit by a variation of said condition for rectification by operation of said motor.

4. A system as set forth in claim 1, a vent passage in said motor, said other of said conduit ends terminating with a vent passage controlled by said vent valve, and said spring means including a spring urging said vent valve toward its closed position.

References Cited

UNITED STATES PATENTS

| | | | |
|---|---|---|---|
| 2,821,343 | 1/1958 | Payne | 236—86 |
| 3,006,552 | 10/1961 | Ferris | 236—86 |
| 3,263,925 | 8/1966 | Joesting | 236—87 |

WILLIAM J. WYE, *Primary Examiner.*